United States Patent
Matsushita et al.

[11] 3,827,785
[45] Aug. 6, 1974

[54] GLASS LENS HAVING REDUCED CHROMATIC ABERRATION AND REFRACTIVE INDEX GRADIENT

[75] Inventors: Kazuo Matsushita, Kobe; Koichi Nishizawa, Itami; Minoru Toyama, Amagasaki, all of Japan

[73] Assignee: Nippon Selfoc Co., Ltd., Tokyo, Japan

[22] Filed: Dec. 22, 1972

[21] Appl. No.: 317,687

[30] Foreign Application Priority Data
Dec. 25, 1971 Japan.............................47-3143

[52] U.S. Cl............ 350/175 GN, 65/30, 106/47 Q, 106/54, 350/96 R
[51] Int. Cl......................... G02b 3/00, G02b 5/14
[58] Field of Search................................ 350/175 GN

[56] References Cited
UNITED STATES PATENTS
3,637,295  1/1972  Matsumura et al.......... 350/175 GN
3,647,406  3/1972  Fisher.................. 350/175 GN UX OTHER PUBLICATIONS
Kitana et al. "A Light Focusing Fiber Guide Prepared by Ion-Exchange Techniques" Reprint from the Proceedings of the 1st Conference on Solid State Devices, Tokyo, 1969, Supplement to the Journal of the Japan Society of Applied Physics, Vol. 39, 1970, pp. 63-70.

*Primary Examiner*—John K. Corbin
*Attorney, Agent, or Firm*—Wenderoth, Lind & Ponack

[57] ABSTRACT

A glass lens having a reduced chromatic aberration and a refractive index gradient such that its refractive index is expressed by the following equation

$$N = No(1 - ar^2)$$

wherein $N$ is the refractive index at a distance $r$ from the central axis of the lens in a cross section perpendicular to the central axis, $No$ is the refractive index at the central axis, and $a$ is a positive constant;

wherein the composition of the glass lens at its central axis is 2–50mol% of $Cs_2O$, 30–98 mol% of $SiO_2$ and 0–30 mol% of $B_2O_3$ with the provisio that ($SiO_2 + B_2O_3$) is 50–98 mol%, and optionally other ingredients, the concentration of cesium ions in the lens gradually decreasing from the central axis of the lens to its peripheral surface to provide said refractive index gradient, said glass lens has a diameter of 0.2 to 5 mm, the difference between the refractive index of the peripheral surface of the lens and $No$ is at least 0.003, and $|\Delta P|/P$ is less than 0.05.

wherein P is $\pi/\sqrt{2a}$, $|\Delta P|$ is the absolute value of the difference between the P for C line light ($P_c$) and the P for F line light ($P_F$), P is P value for D line light.

6 Claims, 4 Drawing Figures

Fig. 3

Fig. 4

GLASS LENS HAVING REDUCED CHROMATIC ABERRATION AND REFRACTIVE INDEX GRADIENT

This invention relates to a glass lens having reduced chromatic aberration and a refractive index distribution such that the refractive index gradually decreases in approximate proportion to the square of the distance from the optical axis.

It has previously been known that a transparent body having a refractive index distribution such that the refractive index gradually decreases in approximate proportion to the square of the distance from the optical axis has a lens action. U.S. Patent Application Ser. No. 147,256 filed Jan. 26, 1971 discloses a method of manufacturing a lens having such a refractive index distribution which comprises immersing a thallium-containing glass rod (or fiber) in a salt containing alkali metals to cause ion-exchange between thallium ions and alkali metal ions. Since this lens has a large refractive index gradient, it is suitable for application in transmission paths of monochromatic light such as a laser beam. However, it has great chromatic aberration, and is unsuitable for use as optical image transmitting lens using a non-monochromatic light or white light.

Lenses having a refractive index distribution such that the refractive index gradually decreases in approximate proportion to the square of the distance from the optical axis (to be referred to simply as "lens" in the present specification and claims) have a refractive index expressed by the following equation.

$$N = No\,(1 - ar^2) \quad (1)$$

wherein $No$ is the refractive index at the optical axis, $r$ is the distance from the optical axis, $a$ is a positive constant, and $N$ is the refractive index at distance $r$.

This lens has a focal distance $f$ expressed by the following equation.

$$f = 1/No\,\sqrt{2a}\,\sin(\sqrt{2a}\,Z) \quad (2)$$

wherein $Z$ is the length of the lens in the direction of the optical axis;

and a principal plane distance $h$ (distance between the principal plane and the end plane of the lens) expressed by the following equation.

$$h = (1/No\,\sqrt{2a})\,\tan(aZ/\sqrt{2a}) \quad (3)$$

The chromatic aberration of the lens is caused by the fact that since $No$ and $a$ differ according to the wavelength of the light, the focal distance $f$ expressed by equation (2) and the principal plane distance $h$ expressed by equation (3) take different values according to the wavelength of the light. The chromatic aberration can be classified into longitudinal chromatic aberration and lateral chromatic aberration. The longitudinal chromatic aberration can be defined by $\Delta f/f$ where $\Delta f$ is the difference in focal distance between two lights of different wavelengths (for example, $\Delta f = f_F - f_C$, where $f_C$ is the focal distance for C line (wavelength 656 m$\mu$) of Franunhofer light and $f_F$ is the focal distance for F line (wavelength 486 m$\mu$)). On the other hand, the lateral chromatic aberration can be defined as $\Delta(f-h)/f-h$ where $f-h$ is the value obtained by subtracting the principal plane distance from the focal distance; that is to say, this represents the distance from the end plane of the lens to the focus, and $\Delta(f-h)$ is the difference in $f - h$ between two lights of different wavelengths (C line and F line).

The extent of the longitudinal and lateral chromatic aberrations of the lens vary periodically with the length Z of the lens in the direction of its optical axis. This will be described by a specific embodiment with reference to FIGS. 1 and 2.

Figure 1:
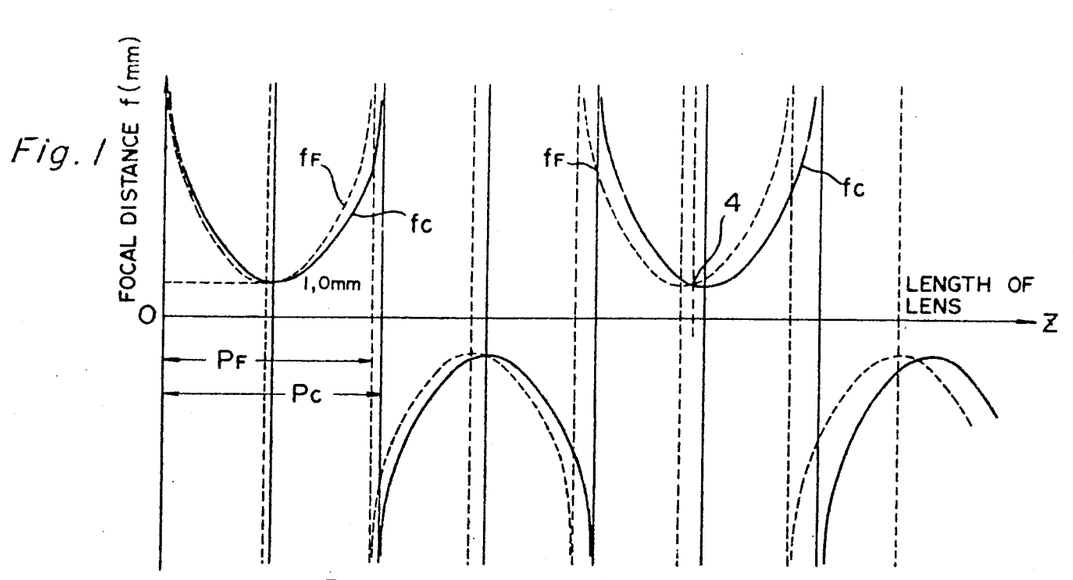
Figure 2:
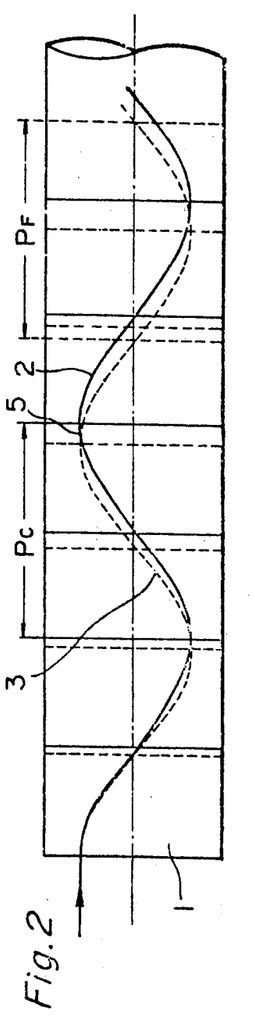

FIG. 1 is a diagram showing the variations of the focal distance $f$ of the lens disclosed in the specification of the aforementioned prior application, for C line and F line in response to the length Z of the lens. This lens is produced, for example, by a glass rod having a diameter of about 1 mm consisting of 3.3 mol% $Tl_2O$, 70.3 mol% $SiO_2$, 17.0 mol% $Na_2O$ and 9.4 mol% $PbO$ in a potassium nitrate bath kept at about 460°C. for about 170 hours. FIG. 2 is a diagram showing the paths of C line and F line which have fallen perpendicularly to the end plane of the lens.

As is naturally expected from equation (2), the value of focal distance $f$ varies periodically with the length of the lens ($2\pi/\sqrt{2a}$) as one period or cycle. This aspect is shown in FIG. 1. Hereinafter, $2\pi/\sqrt{2a}$ will be referred to as 2P (that is, $P = \pi/\sqrt{2a}$). Since the value $a$ differs depending upon the light of C line and the light of F line, the value P for the C line light differs from that for the F line light. In the present specification and claims, we shall designate the P values for the C line light and the F line light $P_C$ and $P_F$ respectively. Further, as an indication of an average P value for visible light rays, we shall use the P value for D line (wavelength 589 m$\mu$) of Fraunhofer rays, and designate it P. Generally, in optical parameters varying with wavelength, values for D line will be used as an average value for visible rays. As previously stated, value $a$ differs depending upon the C line light and the F line light. Therefore, the curve of the focal distance $f_C$ for the C line light and the focal distance $f_F$ for the F line light vary periodically with a period of 2 $P_C$ and 2 $P_F$ respectively. Consequently, there appears a deviation between the curve of $f_C$ and the curve of $f_F$ as shown in FIG. 1. In FIG. 1, $P_C = 4.63$ mm, and $P_F = 4.33$ mm, and P value for D line is 4.60 mm.

FIG. 2 shows the paths of light 2 (C line component) and light 3 (F line component) when the white light was caused to fall perpendicularly to the end plane of the lens 1 as shown by an arrow.

The C line light 2 and the F line 3 proceed in the form of sine wave through the lens with a period of 2 $P_C$ and 2 $P_F$. If a length of the lens is chosen to correspond to the point (for example point 4) at which the curve $f_C$ and the curve $f_F$ intersect each other in FIG. 1, $f_C$ and $f_F$ of the lens become equal. But as shown in FIG. 2, the locus of light of C line issuing from the end plane of the lens does not correspond with that of the F line light. In other words, this shows that although the longitudinal chromatic aberration of the lens of the length corresponding to point 4 is substantially zero, its lateral chromatic aberration is considerably large. Furthermore, if we consider a lens which has been cut with the point (for example, point 5) at which the C line light and the F line light intersect each other being the end plane, the lateral aberration of this lens is zero, but the longitudinal aberration does not become zero. This means that either one of the longitudinal or lateral chromatic aberration of a lens can be removed by properly choosing the length of the lens, but that it is impossible to render both of them zero. Accordingly, the method relying on the choice of the length of the lens cannot lead to a complete solution of the problem of chromatic aberration.

As is clear from FIGS. 1 and 2, the longitudinal and lateral chromatic aberrations become larger with a larger deviation in the curves of the focal distance for the C line light and the F line light respectively and a larger deviation of the curves showing light paths. Therefore, in order to reduce the longitudinal and lateral chromatic aberrations, it is necessary to minimize the deviations of the curves in FIGS. 1 and 2. Let the difference between $P_C$ and $P_F$ be $\Delta P$ (that is, $\Delta P = P_C - P_F$), then chromatic aberration of a lens of a given length becomes smaller as the absolute value of $\Delta P/P$ decreases. Furthermore, there is a tendency that the chromatic aberration of lens increases with a larger length of the lens. P is a value of P for D line.

The chromatic aberration of a lens having a length Z larger than a certain length is expressed by $K = m \cdot |\Delta P|/P$ wherein m is the ratio (Z/P) of the length of the lens (Z) to the length of the half period of the lens (P). It has been experimentally confirmed that if K is not more than 0.2, the chromatic aberration is small enough to enable the lens to be usable for transmission of images. Thus, an attempt to reduce the chromatic aberration of lens by minimizing the K value furnishes a method of essentially solving the problem of chromatic aberration. This makes it possible to reduce an overall chromatic aberration which takes into account both longitudinal and lateral chromatic aberrations.

In addition to chromatic aberration, there are other requirements which a lens should meet. One of them is a requirement for an aperture angle. In order to meet the basic requirement of transmitting an image of a desired size with a required brightness, it is necessary for the lens to have an aperture angle of at least about 10°. On the other hand, where the aperture angle of the lens is $2\theta$, $\sin \theta = \sqrt{2No \cdot \Delta n}$ holds good. In this equation, No is the refractive index at the optical axis, and is usually about 1.5 to about 1.6. The symbol $\Delta n$ represents the difference between the refractive index $N_1$ at the peripheral surface of the lens and the refractive index No at the optical central axis. As is clear from the above equation, the aperture angle of the lens $2\theta$ is dominated mainly by the value $\Delta n$, and in order that the aperture angle $2\theta$ is at least about 10°, it is necessary for $\Delta n$ to be at least 0.003.

The lens is further required that its diameter should be larger than a certain value, because if the diameter of the lens is too small, the lens does not have the resolving power and brightness required to transmit an optical image. For this reason, the lens should have a diameter of at least 0.2 mm, preferably at least 0.3 mm. There is no specific reason for setting the upper limit of the diameter of the lens when the performance of the lens is considered. However, since lenses with a diameter of about 5 mm are difficult to produce by the ion exchange method, the upper limit of the lens diameter will be automatically determined by productional restrictions.

Furthermore, the lens desirably has a large length, because the transmission distance increases to advantage with larger lengths of the lens. The length of the lens is at least 5 cm, and very preferably at least 10 cm. Or the length Z of the lens is at least 3P, or at least 50 times as large as the diameter of the lens.

If the thallium content of the optical axis of a thallium-containing lens is increased while maintaining the thallium content at the surface of the lens substantially zero, the $a$ value of the lens increases and therefore the P value decreases. The absolute value of $|\Delta P|/P$ decreases when the content of thallium is increased. For example, when the thallium content at the optical axis of the lens is maintained at 0.5 mol%, 2 mol%, 8 mol%, and 16 mol% respectively, the absolute value $|\Delta P|/P$ is 0.17, 0.07, 0.06 and 0.055 respectively. Even when the thallium content at the optical axis is increased, the absolute value $|\Delta P|/P$ does not further decrease. In addition, because the glass tends to be devitrified, and undesirably colored, the thallium content can no longer be increased. Accordingly, so long as glass containing thallium is used, the absolute value $|\Delta P|/P$ is difficult to reduce beyond 0.05.

On the other hand, the K value of a thallium-containing lens of a given length can be reduced with a smaller content of thallium. If the content of thallium is decreased in equation $K = Z/P \times |\Delta P|/P$, $|\Delta P|/P$ increases at a slow rate, and by reducing the content of thallium, the value $a$ decreases, and consequently 1/P decreases. Besides, the rate of decrease of 1/P becomes higher than the slow rate of increase of $|\Delta P|/P$. While it seems that the K value of thallium-containing lens can be reduced to a desired value by decreasing the thallium content, the decrease in thallium content is accompanied by a decrease in the $\Delta n$ value, and in order to provide the $\Delta n$ value of more than 0.003, the decrease of the thallium content is limited, and the thallium content of the optical axis of the lens cannot be made smaller than 0.5 mol%.

Now, a lens having a diameter of 1.0 mm whose optical axis has a thallium content of 0.5 mol% and at the surface of which all thallium ions have been substituted with potassium ions will be considered. This lens has the smallest chromatic aberration among thallium-containing lenses. The lens has $\Delta n$ of 0.003 and $|\Delta P|/P$ of 0.17. The P value of this lens can be calculated from the following equation. Generally, the following relation exists among $\Delta n$, P and the radius R of the lens.

$$2P^2 \cdot \Delta n = \pi^2 \cdot No \cdot R^2$$

Since No is about 1.5 to about 1.6, P is about 26 mm when $\Delta n$ is 0.003 and R is 0.5 mm.

When K is 0.2 in equation $K = Z/P \cdot |\Delta P|/P$, Z is about 3 cm. Since K must be not more than 0.2, lenses having a length larger than about 3 cm have a great chromatic aberration, and cannot be used for transmitting optical images of white light. In other words, the conventional thallium-containing lenses having a diameter of 1.0 mm cannot have a length of more than about 3 cm while retaining a reduced chromatic aberration.

If the diameter of the thallium-containing lens is larger, for example 2.0 mm, its P value is about 52 mm according to the same calculation as mentioned above. In order that K value is not more than 0.2, the length of the lens should be not more than about 6 cm.

A lens having a diameter of 1.0 mm whose optical axis has a thallium content of about 1 mol% and at the surface of which all thallium ions have been substituted with potassium ions has a P value of 12.8 mm, $|\Delta P|/P$ of 0.10 and $\Delta n$ of 0.012, and in order to obtain a K value of 0.2, its length is 2.6 cm.

As is clear from the above description, if in the prior art it is attempted to obtain thallium-containing lenses having feasible chromatic aberration, the length of the lenses is inevitably restricted, and it has been impossible to produce lenses of sufficient lengths. This is because in the thallium-containing lenses, $|\Delta P|/P$ values are relatively large.

The reason why the thallium-containing lens has such a large $|\Delta P|/P$ is that the dispersion of a thallium-rich glass at the optical axis differs relatively greatly from the dispersion of an alkali metal-rich glass at the peripheral surface of the lens, as compared with the refractive index gradient of the lens obtained by ion exchange [that is, the difference between the refractive index $N_o$ at the optical axis of the lens and the refractive index $N_1$ at the peripheral surface of the lens ($N_o - N_1$) or $\Delta n$]. In other words, the difference in the Abbe number of the glass at the optical axis and that of the glass at the peripheral surface is relatively large as compared with $\Delta n$.

It has now been found that by contacting a glass rod containing cesium with a source of metal ions such as sodium, potassium, lithium or rubidium to exchange the cesium ions of the surface of the rod with the metal ions, and to equalize $\Delta n$ of the lens to $\Delta n$ of the lens resulting from the above thallium-alkali metal ion exchange, the Abbe numbers of the glass at the optical axis and the glass at the peripheral surface is far smaller than in the case of the thallium-containing lens, and therefore, a lens of a reduced chromatic aberration with a very small $|\Delta P|/P$ can be obtained.

An object of this invention is to provide a novel lens having a refractive index gradient which provides a reduced chromatic aberration.

Another object of this invention is to provide a lens having reduced chromatic aberration and a sufficient length.

The present invention provides a glass lens having a refractive index gradient such that its refractive index is expressed by the following equation $$N = No(1 - ar^2)$$

wherein N is the refractive index at a distance $r$ from the central axis in a cross section perpendicular to the central axis, $No$ is the refractive index at the central axis, and $a$ is a positive constant; wherein said lens comprises at its central axis 2 – 50 mol% of $Cs_2O$, 30 – 98 mol% of $SiO_2$ and 0 – 30 mol% of $B_2O_3$ with the proviso that $(SiO_2 + B_2O_3)$ is 50 – 98 mol%, and optionally other ingredients, the concentration of cesium ions in the lens gradually decreasing from the central axis of the lens to its peripheral surface to provide said refractive index gradient, said glass lens has a diameter of 0.2 to 5 mm, the difference between the refractive index of the peripheral surface of the lens and $No$ is at least 0.003, and $|\Delta P|/P$ is less than 0.05.

wherein P is $\pi/\sqrt{2a}$, $|\Delta P|$ is the absolute value of the difference between the P for C line light ($P_C$) and the P for F line light ($P_F$), P is the P value for D line light.

The glass lens of this invention comprises 2 to 50 mol% of $Cs_2O$, 30 to 98 mol% of $SiO_2$, and 2 to 30 mol% of $B_2O_3$ with the proviso that the total proportion of $SiO_2 + B_2O_3$ is 50 to 98 mol% at its central axis. If desired, it can include other components. The cesium ion concentration of the glass lens outwardly decreases gradually from the central axis. This gradient of the cesium ion concentration can be furnished by contacting a homogeneous glass rod of the above composition with an ion source containing at least one metallic ion selected from the group consisting of lithium, sodium, potassium and rubidium (such as a molten salt of the respective metal, preferably a nitrate such as $NaNO_3$ or $KNO_3$ or a mixture of sulfates such as a mixture of $K_2SO_4$ and $ZnSO_4$) at the peripheral surface of the glass rod to exchange the cesium ions present in the vicinity of the surface of the glass rod with the metallic ions. The refractive index gradient $N = No(1 - ar^2)$ is induced substantially owing to the gradient of the cesium ion concentration of the lens thus formed. It should be noted that the lens of this invention is substantially free from thallium.

Variations in the distribution of these ions and the distribution of the refractive index with the passage of time during which the glass rod is brought into contact with the metallic ion source will be described by reference to FIGS. 3 and 4.

Figure 3:
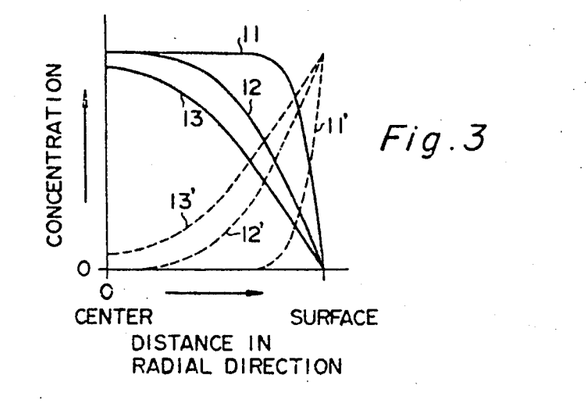
Figure 4:
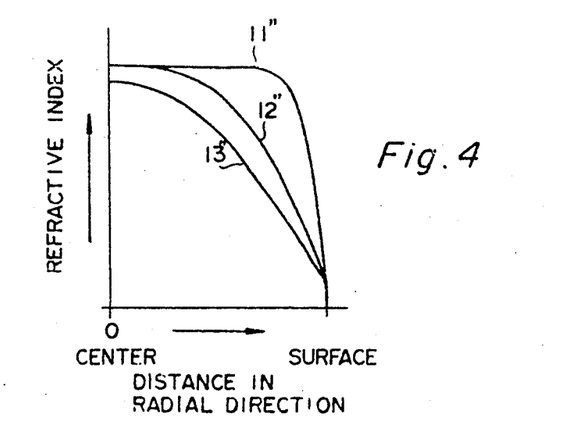

FIG. 3 shows the concentration of the ions at a radial distance from the central axis in a cross section perpendicular to the central axis of the rod.

In the initial stage of contact, ion exchange occurs at that part of the glass rod which is near its surface, and therefore, as shown by solid line 11 in FIG. 3, the concentration of cesium ions in the inside of the rod at this time equals the concentration before ion exchange in the vicinity of the central part of the rod, and abruptly decreases towards the surface at a part very close to the surface of the rod. The concentration of ions diffusing from the ion source to the inside of the glass rod, for example, potassium ions, decreases from the surface toward the inside, and at the central part of the rod, the concentration of the potassium ions is zero, as is shown by dotted line 11' in FIG. 3. With the passage of the contacting time, the ion exchange proceeds to the inside of the glass rod; in other words, the potassium ions diffuse further inside. The concentrations of cesium ions and potassium ions at a time when the potassium ions have almost reached the center are shown by 12 and 12' in FIG. 3. As the ion exchange proceeds further, the concentrations of cesium ions and potassium ions attain values as shown by 13 and 13' of FIG. 3. Thus, the concentration of cesium ions at the center of the rod becomes lower than that before the ion exchange, and the concentration of potassium ions at the center of the rod becomes higher. The refractive index distributions of the glass rod when the concentrations of the ions are at the three stages shown in FIG. 3 are shown by curves 11'', 12'' and 13'' respectively in FIG. 4 corresponding to the cesium ion concentrations 11, 12 and 13 in FIG. 3. The refractive index curve 11'' does not satisfy the equation $N = No(1 - ar^2)$, but the curves 12'' and 13'' satisfy this equation. Accordingly, the proper contacting time is determined so that the cesium ion concentration is shown by 12 and 13 and the refractive index distributions, by 12'' and 13''. Too long a contacting time is undesirable since it renders the gradient of the concentrations of the ions and the gradient of the refractive indec gentle, and consequently, the necessary $\Delta n$ (the difference in refractive index between the center and the surface) cannot be obtained.

If the glass rod before ion exchange treatment contains cesium ions and alkali metal ions for example sodium ions, the concentration of sodium ions usually shows similar curves to the concentration of cesium ions 11, 12 and 13 as a result of the ion exchange. Since, however, the sodium ion and potassium ion have greater rates of diffusion than cesium ions, ion exchange may take place between the sodium ions in the glass rod and potassium ions from the external ion source after the gradient of each ion concentration has been formed. In such a case, the gradient of the concentration of cesium ions is almost maintained, but the gradients of sodium and potassium ion concentrations may sometimes become flat. However, the refractive index hardly changes by ion exchange between sodium and potassium. Therefore, the gradients of the concentrations of these ions scarcely affect the gradient of the refractive index of lens, and the refractive index gradient is formed mainly by the gradient of the concentration of cesium ions.

In many cases, the concentration of cesium ions at the peripheral surface of the lens of this invention is almost zero, but it is not altogether necessary to render it zero. For example, at times, $\Delta n$ is controlled by adding a small amount of cesium ions to the metallic ion source to be exchanged with the cesium ions in the glass, and at such times, the concentration of the cesium ions at the peripheral surface does not become zero.

The temperature at which the homogeneous glass rod is contacted with the external ion source should be at least 400°C. in order for cesium ions present in the glass rod to diffuse and move. However, if this temperature is too high, the glass tends to be deformed, and therefore, the contacting temperature preferably does not exceed 600°C.

The lens of this invention can be produced by a process which comprises contacting a glass rod having a circular cross section and a uniform refractive index and comprising 2 – 50 mol% of $Cs_2O$, 30 – 98 mol% of $SiOhd 2$ and 0 to 30 mol% of $B_2O_3$ with the total proportion of $SiO_2 + B_2O_3$ being 50 – 98 mol% (if desired, containing other ingredients) at 400°C. to 600°C. with a melt of a salt of at least one metal selected from the group consisting of sodium, potassium, lithium and rubidium thereby to exchange cesium ions present close to the surface of the rod with said metal ions and reduce the refractive index at a part closer to the surface of the rod more vigorously than said uniform refractive index.

In the lens of the present invention, the glass composition at the central axis is limited as mentioned above for the reasons to be given. $Cs_2O$ should be contained in an amount of at least 2 mol% in order to provide the desired refractive index gradient. But if its amount exceeds 50 mol%, the glass tends to be devitrified and is difficult to fabricate. $SiO_2$ should be contained in an amount of at least 30 mol% for vitrification. $B_2O_3$ is not an essential ingredient, but preferred because it reduced the melting point of the glass. Amounts in excess of 30 percent are unsuitable because such an amount of $B_2O_3$ causes difficulty of vitrification. When the glass contains $B_2O_3$, it is necessary, for vitrification purposes that the total amount of $SiO_2$ and $B_2O_3$ is at least 50 mol%. The glass may, if desired, contain other ingredients such as $Na_2O$, $K_2O$ and $Rb_2O$ each in an amount of 0 to 30 mol%, $Li_2O$ in an amount of 0 to 10 mol%, with the proviso that the total proportion of $Cs_2O + Na_2O + K_2O + Rb_2O + Li_2O$ should be within the range of 2 to 50 mol%. If the proportion of $Li_2O$ exceeds 10 mol%, glass tends to be devitrified, and if the total amount of $Cs_2O + Na_2O + K_2O + Rb_2O + Li_2O$ exceeds 50 mol%, vitrification becomes difficult. Sodium, potassium, lithium or rubidium ions to be exchanged with the cesium ions in the glass have a smaller ion radius than the cesium ions, and therefore, tensile stress may occur on the peripheral surface of the glass lens as a result of ion exchange to deteriorate the optical and mechanical properties of the lens. This occurrence of tensile stress can be prevented, for example, by incorporating sodium ions, which have a smaller ion radius than the potassium ions, into the glass as $Na_2O$ when the potassium ions are exchanged with the cesium ions. In order to improve the weatherability of the glass, ZnO, CaO or MgO may be incorporated. If the amount of ZnO, CaO or MgO or the total amount of these is too large, the rate of ion exchange becomes low. Accordingly, the total amount of these ingredients should not exceed 20 mol%.

The lens of this invention is sometimes used in intimate contact with other optical component parts such as a lens or prism. In such a case, it is sometimes desired to make the refractive index (average value) of the lens of this invention close to that of the optical component part, in order to minimize reflection loss at the interface between the lens of this invention and the optical component part. In such a case, the average refractive index of the lens can be controlled by incorporating less than about 10 mol% of at least one of PbO, BaO, $Al_2O_3$ and $La_2O_3$ in the glass.

The preferred composition of the glass lens at its central axis is as follows: 2 – 15 mol% of $Cs_2O$, 45 – 85 mol% of $SiO_2$ and 0 to 30 mol% of $B_2O_3$ with the proviso that the total proportion of $SiO_2 + B_2O_3$ is 55 to 90 mol%; 0 – 30 mol% each of $Na_2O$, $K_2O$ and $Rb_2O$ and 0 – 10 mol% of $Li_2O$ with the proviso that the total proportion of $Na_2O + K_2O + Rb_2O + Li_2O$ is 2 – 40 mol% and the total proportion of $Cs_2O + Na_2O + K_2O + Rb_2O + Li_2O$ is 4 to 50 mol%; and 2 to 20 mol% of at least one component selected from the group consisting of ZnO, CaO, MgO, PbO, BaO and $Al_2O_3$. The reason for this limitation of the composition of the glass lens at its central axis is as follows: If the proportion of $Cs_2O$ exceeds 15 mol%, the weatherability of the glass tends to become poor. If the proportion of $SiO_2$ is lower than 45 mol%, the weatherability of the glass becomes poor, and if it is higher than 85 mol%, the melting temperature of above 1550°C. is required, and therefore, the processability of the glass becomes poor. If $Na_2O$, $K_2O$, $Rb_2O$ and $Li_2O$ are contained in the amounts specified above, there is an advantage that the melting and fabrication of glass become easy. If the total proportion of these four alkali metal oxides exceeds 40 mol%, the weatherability of glass becomes poor. Furthermore, when the total amount of $Cs_2O + Na_2O + K_2O + Rb_2O + Li_2O$ exceeds 50 mol%, vitrification becomes difficult. The incorporation of at least 2 mol% of at least one compound selected from ZnO, CaO, MgO, PbO, BaO, $Al_2O_3$ and $La_2O_3$ is preferred for improving the weatherability of glass. However, if the total amount exceeds 20 mol%, the rate of diffusion of cesium during ion exchange becomes lower, and therefore, it is not desirable. If the total amount of $SiO_2 + B_2O_3$ is more than 90 mol%, the melting temperature of the glass undesirably becomes high.

The most preferred composition of the glass lens of this invention at its central axis is as follows: 3 – 7 mol% of $Cs_2O$, 55 – 75 mol% of $SiO_2$, the amount of $Na_2O$ and/or $K_2O$ is 12 – 25 mol%, 4 – 10 mol% of ZnO, and the total amount of $Cs_2O$, $SiO_2$, $Na_2O$, $K_2O$ and ZnO is at least 95 mol%. Other ingredients may be included in an amount of not more than 5 mol%. The reason for this greatest preference is as follows: In order to provide the lens with the desired refractive index gradient, $Cs_2O$ is preferably contained in an amount of at least 3 mol%. However, if it exceeds 7 mol%, the weatherability of the glass tends to be deteriorated. If the $SiO_2$ content is lower than 55 mol%, the weatherability of the glass becomes poor. If it exceeds 75 mol%, there is a tendency that the melting temperature becomes too high. The incorporation of at least 12 mol% of $Na_2O$ + $K_2O$ brings about the advantage of easy melting and shaping of glass, but if the total amount of these metal oxides exceeds 25 mol%, the weatherability of the glass becomes poor. If ZnO is contained in an amount of at least 4 mol%, the devitrification of glass during ion exchange can be prevented. However, if it is above 10 mol%, there is a tendency that the diffusion of cesium during ion exchange is hampered.

With a view to retaining sufficient resolving power and brightness, the lens of this invention has a diameter of 0.2 to 5 mm, preferably at least 0.3 mm. Lenses having a diameter of above 5 mm are difficult to produce by ion-exchange. Furthermore, in the lens of this invention, the difference between the refractive index at the peripheral surface of the lens and the refractive index $N_o$ at the central axis should be at least 0.003 is order to obtain an aperature angle required to transmit optical images. Furthermore, the lens of this invention is characterized by the fact that $|\Delta P|/P$ wherein $|\Delta P|$ is an absolute value of the difference between $P_C$ and $P_F$ is not more than 0.05. Because of this, the lens of this invention has the superior characteristic that it has markedly reduced chromatic aberration as compared with the conventional lenses. The length of the lens of this invention is preferably at least 50 mm, and more preferably 100 mm.

Some examples of the lens of this invention will be shown in Tables 1 and 2 below as to performance.

Lenses which have a composition at the central axis thereof comprising 2 to 50 mol% of $Cs_2O$ and the remainder being $SiO_2$ and at the peripheral surface of which all of the cesium ions are substantially exchanged with potassium ions have the $\Delta n$ and $\Delta P/P$ shown in Table 1 in which R stands for the radius of the lens.

TABLE 1

| Amount of $Cs_2O$ (mol%) at the central axis | $\Delta n$ | $\Delta P/P$ | P/R |
| --- | --- | --- | --- |
| 2 | 0.005 | −0.0121 | 40.0 |
| 5 | 0.012 | −0.0081 | 25.7 |
| 10 | 0.015 | −0.0012 | 23.0 |
| 20 | 0.020 | 0.0020 | 19.9 |
| 50 | 0.032 | 0.0089 | 15.7 |

Lenses which have a composition at the central axis thereof comprising 10 mol% of $Cs_2O$ and 90 mol% of $SiO_2$ and at the peripheral surface of which all of the cesium ions are exchanged substantially with rubidium, lithium or sodium ions have the $\Delta n$ and $\Delta P/P$ shown in Table 2.

TABLE 2

| Ions to be exchanged with the cesium ions | $\Delta n$ | $\Delta P/P$ | P/R |
| --- | --- | --- | --- |
| Rubidium | 0.020 | −0.0018 | 19.9 |
| Lithium | 0.021 | −0.0074 | 19.4 |
| Sodium | 0.010 | −0.0013 | 8.9 |

In Table 1, a lens containing 5 mol% of $Cs_2O$ has $\Delta n$ of 0.012 and $\Delta P/P$ of −0.0081. When the diameter of this lens is 1.0 mm, P, calculated from P/R = 25.7, is about 12.8 mm. The chromatic aberration K of this lens having a radius of 0.5 mm and a length of 20 cm is 0.13, and the lens having a radius of 0.5 mm whose chromatic aberration K is equal to the critical value 0.2 has a length of about 32 cm. As stated previously, $\Delta n$ determines the aperture angle of the lens, and with larger $\Delta n$, the lens can transmit brighter images. Thus, generally, larger $\Delta n$ values are preferred. In the present invention, $\Delta n$ can be increased by increasing the $Cs_2O$ content of the lens at its central axis, and this increase in the content of $Cs_2O$ results in the increase in the chromatic aberration of a lens having a length Z. This tendency is the same as in the case of $Tl_2O$. Accordingly, when the length of the lens is relatively large, the $\Delta n$ of the lens is preferably 0.005 to 0.025.

It has already been stated that when the length of the lens is considerably large, the chromatic aberration of the lens depends chiefly upon the K value. On the other hand, when the length of the lens is small, especially when the length of the lens is shorter than P/2, the chromatic aberration is affected mainly by variations in the focal distance.

Let the focal distances $f$ and $N_o$ for C line light be $f_C$ and $N_{OC}$, the focal distances $f$ and $N_o$ for F line light be $f_F$ and $N_{OF}$, the length of the lens Z be Z, $(f_F - f_C)$ be $\Delta f$, and $(N_{OF} - N_{OC})$ be $\Delta N_o$, we get the following equation from equation (2).

$$\Delta f/f = \Delta P/P \cdot \pi \cdot Z/P \cdot \cot(\pi \cdot Z/P) + \Delta P/P - \Delta N_o/N_o$$

A conventional thallium-containing glass lens obtained by treating glass rod comprising 60 mol% of $SiO_2$, 15 mol% of $B_2O_3$, 24 mol% of $Na_2O$ and 1 mol% of $Tl_2O$ with a potassium salt to provide a $Tl_2O$ content of 1 mol% at the central axis and exchange all thallium ions with potassium ions at the peripheral surface of the lens will be compared in regard to $\Delta f/f$ with the lens of this invention which is obtained by treating a glass rod comprising 60 mol% of $SiO_2$, 15 mol% of $B_2O_3$, 20 mol% of $Na_2O$ and 5 mol% of $Cs_2O$ with a potassium salt to provide a $Cs_2O$ content of 5 mol% at the central axis and exchange all of the cesium ions with potassium ions at the peripheral surface of the lens. The compositions of the lenses are selected so that the P value of both lenses become equal. The diameters of both lenses are about 0.25 mm so that P is about 3.1 mm. The $N_o$, the Abbe number $V_0$ at the central axis, $\Delta N_o$, $\Delta N_o/N_o$, and $\Delta P/P$ of these lenses are shown in Table 3.

TABLE 3

| | $N_o$ | $V_o$ | $\Delta N_o$ | $\Delta N_o/N_o$ | $\Delta P/P$ |
|---|---|---|---|---|---|
| Cesium glass | 1.48 | 66 | 0.0073 | 0.0049 | −0.008 |
| Thallium glass | 1.49 | 50 | 0.0098 | 0.0066 | −0.08 |

If the above values are substituted for the above equation, we get the following for the cesium glass $$\Delta f/f = -0.008 \cdot Z \cdot \cot Z - 0.008 - 0.005$$

and the following for the thallium glass $$\Delta f/f = -0.08 \cdot Z \cdot \cot Z - 0.080 - 0.007$$

Therefore, the chromatic aberration $\Delta f/f$ with the length of the lens being 0.5, 1.0 and 1.57 mm are shown in Table 4.

TABLE 4

| Length of lens (mm) | $\Delta f/f$ of the cesium glass | $\Delta f/f$ of the thallium glass |
|---|---|---|
| 0.5 | | −0.160 |
| 1.0 | −0.018 | −0.138 |
| 1.57 | −0.013 | −0.087 |

As is shown in Table 4, the chromatic aberration of the cesium glass lens of this invention is smaller than that of the conventional thallium glass lens even when the length of the lens is smaller.

Another merit of the lens of this invention is that although a thallium-containing lens has a large absorption of ultraviolet rays based on the absorption of thallium ions, the cesium-containing lens of this invention has a small absorption of ultraviolet rays, and therefore the lens of this invention is effective for transmitting ultraviolet rays. For example, a 5 mm-long lens containing 3 mol% and 1 mol% respectively of thallium at its center permits transmission of zero percent and 75 percent respectively of light of wavelength of 320 m82 , whereas the lens of this invention having a length of 5 mm and containing 5 mol% of cesium at the center can transmit 98 percent of light of wavelength of 320 m$\mu$.

The lens having a refractive index gradient can be made by contacting a glass rod containing lithium oxide instead of cesium oxide with a salt containing sodium, potassium or rubidium ions to exchange the lithium ions present near the surface of the glass rod with sodium ions (or potassium or rubidium ions). However, in order to obtain a large refractive index gradient, that is $\Delta n$ of at least 0.003, it is necessary to include a large quantity of lithium oxide into glass. The glass containing a large quantity of lithium oxide has the defect that it tends to be devitrified and is difficult to fabricate into a rod form. The present invention is free from such a defect.

The invention will be described by the following Examples.

EXAMPLE 1

A glass rod with a diameter of about 1.2 mm and a length of about 22 cm having a refractive index of 1.535 and comprising 59% $SiO_2$, 18% $Cs_2O$, 14% $Na_2O$, and 9% ZnO by weight (71.0% $SiO_2$, 4.6% $Cs_2O$, 16.3% $Na_2O$ and 8.1% ZnO by mol) was immersed in a bath of molten potassium nitrate maintained at 560°C. for about 120 hours.

In order to prevent the decomposition of potassium nitrate at high temperatures, the molten bath was placed in a closable vessel and the vessel was closed. The molten bath was maintained at the high temperature by a heating device provided exteriorly of the vessel. By this immersion, the sodium ions and cesium ions present close to the surface of the glass rod were exchanged with potassium ions in the molten bath. The sodium ions and the cesium ions near the surface of the glass rod were dissolved into the molten salt bath from the surface of the glass rod, and the potassium ions present in the molten salt diffused into the glass rod. Consequently, in the interior of the glass rod, the cesium ions and sodium ions had a concentration gradually decreasing from the central axis towards the surface, and the potassium ions gradually increased from the central axis towards the surface. This was confirmed by an electron microprobe X ray analyzer. It was confirmed by a refractive index meter that by the concentration distributions of cesium ions and potassium ions, the refractive index continuously decreases from the central axis of the glass rod towards the surface in substantial proportion to the square of the distance from the central axis. Since the surface layer about 0.1 mm depth of the glass rod slightly deviated from this refractive index distribution, the surface layer was removed by immersing the glass rod in a 3 wt. percent aqueous solution of fluoric acid. The glass rod which had a diameter of about 1.0 mm by the removal of the surface layer was cut at both end faces, and polished to form a rod-like lens having a length of 20 cm.

This rod-like lens had the same composition at its central axis as that of the original glass rod and had a refractive index of 1.535 at its central axis and 1.525 at its peripheral surface. The gradient of the refractive index was about 0.024 mm$^{-2}$ in term of $a$ value. The Abbe number of the glass at its central axis was 56.64, and the Abbe number of the glass at its peripheral surface was 56.40. The P and $\Delta P/P$ of the lens were 14 mm and −0.0038 respectively. When an image of an object was observed using this lens, it was confirmed that it had very much reduced chromatic abberation. The chromatic abberation K of this lens having a length of 20 cm was 0.06. The length of the lens which corresponds to a critical K value of 0.2 was about 70 cm.

EXAMPLES 2 TO 10

In each run, a glass rod having a diameter of about 1.2 mm and a length of about 22 cm and the various compositions and refractive indices as shown in Table 5 was treated under the conditions shown in Table 6 using a molten bath of $KNO_3$ or $NaNO_3$ as an ion exchange bath by the same method as in Example 1. There were produced a variety of rod-like lenses having a length of 20 cm and a diameter of about 1.0 mm. The properties of these rod-like lenses are shown in Table 7. For ease of comparison, the results obtained in Example 1 were also given in Tables 5, 6 and 7.

TABLE 5

Compositions (mol%) of the glass rods before the ion-exchange and their refractive indices

| Composition | Examples | | | | | | | | | |
|---|---|---|---|---|---|---|---|---|---|---|
| | 1 | 2 | 3 | 4 | 5 | 6 | 7 | 8 | 9 | 10 |
| $SiO_2$ | 71.0 | 64.5 | 65.7 | 68.5 | 48.1 | 56.3 | 76.4 | 86.2 | 52.0 | 73.8 |
| $Cs_2O$ | 4.6 | 6.9 | 14.0 | 4.9 | 4.0 | 14.1 | | | 18.5 | |
| $Na_2O$ | 16.3 | 15.6 | 15.9 | 11.0 | 12.0 | 4.7 | 9.8 | 2.6 | 16.8 | 5.2 |
| $K_2O$ | | | | | | | | | | |
| $Li_2O$ | | | | 11.5 | | | | | | 7.8 |
| $Rb_2O$ | | | | | | | 4.9 | 4.0 | | |
| ZnO | 8.1 | | | 4.1 | | | | | 12.7 | |
| CaO | | | | | | | | | | |
| MgO | | | | | 19.9 | | | | | 13.2 |
| PbO | | 13.0 | 4.4 | | | | | | | |
| BaO | | | | | | 6.1 | | | | |
| $Al_2O_3$ | | | | | | | 8.9 | 7.2 | | |
| $B_2O_3$ | | | | | 16.0 | 18.8 | | | | |
| Refractive indices | 1.535 | 1.603 | 1.558 | 1.531 | 1.485 | 1.513 | 1.512 | 1.492 | 1.558 | 1.535 |

TABLE 6

Ion exchanging conditions

| | Examples | | | | | | | | | |
|---|---|---|---|---|---|---|---|---|---|---|
| | 1 | 2 | 3 | 4 | 5 | 6 | 7 | 8 | 9 | 10 |
| Diameter of the glass rod (mm) | 1.2 | 1.2 | 1.2 | 1.2 | 1.2 | 1.2 | 1.2 | 1.2 | 1.2 | 1.2 |
| Composition of the salt bath | $KNO_3$ | $KNO_3$ | $KNO_3$ | $KNO_3$ | $NaNO_3$ | $KNO_3$ | $KNO_3$ | $KNO_3$ | $KNO_3$ | $KNO_3$ |
| Temperature of the salt bath and the immersion time | 560°C 120hr | 470°C 120hr | 490°C 120hr | 490°C 120hr | 490°C 120hr | 510°C 150hr | 550°C 180hr | 600°C 150hr | 510°C 150hr | 600°C 150hr |
| Thickness of the surface each removed (mm) | 0.1 | 0.1 | 0.1 | 0.1 | 0.1 | 0.1 | 0.1 | 0.1 | 0.1 | 0.1 |

TABLE 7

Performance of lens

| | Example | | | | | | | | | |
|---|---|---|---|---|---|---|---|---|---|---|
| | 1 | 2 | 3 | 4 | 5 | 6 | 7 | 8 | 9 | 10 |
| Abbe number at the central axis | 56.64 | 41.77 | 51.58 | 57.31 | 60.46 | 63.17 | 61.92 | 63.90 | 53.96 | 60.68 |
| Abbe number at the peripheral surface | 56.40 | 41.43 | 50.00 | 56.61 | 59.84 | 62.22 | 60.68 | 63.48 | 52.18 | 59.53 |
| Refractive index at the center | 1.535 | 1.603 | 1.558 | 1.531 | 1.485 | 1.513 | 1.512 | 1.492 | 1.558 | 1.535 |
| Refractive index at the surface | 1.525 | 1.590 | 1.535 | 1.512 | 1.475 | 1.488 | 1.497 | 1.487 | 1.533 | 1.522 |
| $a$ (mm$^{-2}$) | 0.024 | 0.023 | 0.041 | 0.035 | 0.019 | 0.046 | 0.028 | 0.009 | 0.045 | 0.024 |
| $p$ (mm) | 14 | 15 | 11 | 12 | 16 | 10 | 13 | 23 | 11 | 15 |
| $\Delta p/p$ | −0.0038 | −0.0046 | 0.0009 | −0.0028 | −0.0015 | −0.0030 | 0.0003 | 0.0010 | 0.0080 | 0.0015 |
| K of the lens with a length of 20 cm | 0.054 | 0.062 | 0.016 | 0.047 | 0.019 | 0.058 | 0.0045 | 0.0087 | 0.152 | 0.021 |
| length of lens (cm) which provides K=0.2 | 70 | 64 | 253 | 86 | 216 | 69 | 893 | 460 | 26 | 193 |

What is claimed is:

1. A glass lens having a reduced chromatic aberration and a refractive index gradient such that its refractive index is expressed by the following equation $$N = No(1 - ar^2)$$

wherein N is the refractive index at a distance $r$ from the central axis of the lens in a cross section perpendicular to the central axis, $No$ is the refractive index at the central axis, and $a$ is a positive constant; wherein the composition of the glass lens at its central axis contains as the essential components 2–50 mol% of $Cs_2O$, 30–98 mol% of $SiO_2$ and 0–30 mol% of $B_2O_3$ with the proviso that $(SiO_2 + B_2O_3)$ is 50–98 mol%, the concentration of cesium ions in the lens gradually decreasing from the central axis of the lens to its peripheral surface to provide said refractive index gradient, said glass lens has a diameter of 0.2 to 5 mm, the difference between the refractive index of the peripheral surface of the lens and $No$ is at least 0.003, and $|\Delta P|/P$ is less than 0.05 wherein P is $\pi/\sqrt{2a}$ and is half the period of the focal distance curve of the D line light, $|\Delta P|$ is the absolute value of the difference between the P for C line light ($P_C$) and the P for F line light ($P_F$).

2. The glass lens of claim 1 wherein as the other ingredients, the glass contains at the central axis of the lens 0–30 mol% each of $Na_2O$, $K_2O$ and $Rb_2O$ and 0 to 10 mol% of $Li_2O$ with the proviso that the total proportion of $Cs_2O + Na_2O + K_2O + Rb_2O + Li_2O$ is 2 to 50 mol%; it contains 0 to 20 mol% of at least one ingredient selected from the group consisting of ZnO, CaO and MgO; and it further contains 0 to 10 mol% of at least one ingredient selected from the group consisting of PbO, BaO, $Al_2O_3$ and $La_2O_3$.

3. The glass lens of claim 1 which has a length (Z) of at least 50 mm and a chromatic aberration $K = Z/P \cdot |\Delta P|/P$ of not more than 0.2.

4. The glass lens of claim 1 wherein the composition of the glass lens at its central axis is 2–15 mol% $Cs_2O$, 45–85 mol% $SiO_2$, and 0–30 mol% of $B_2O_3$ with the proviso that the total proportion of $SiO_2 + B_2O_3$ was 55–90 mol%; 0 to 30 mol% each of $Na_2O$, $K_2O$ and $Rb_2O$, 0–10 mol% of $Li_2O$ with the proviso that the total proportion of $Na_2O + K_2O + Rb_2O + Li_2O$ is 2–40 mol% and the total proportion of $Cs_2O + Na_2O + K_2O + Rb_2O + Li_2O$ is 4 to 50 mol%; and 2 to 20 mol% of at least one ingredient selected from the group consisting of ZnO, CaO, MgO, PbO, BaO, $Al_2O_3$ and $La_2O_3$.

5. The glass lens of claim 1 wherein the composition at its central axis is 3–7 mol% of $Cs_2O$, 55–75 mol% of $SiO_2$, the total amount of at least one ingredient selected from the group consisting of $Na_2O$ and $K_2O$ is 12–25 mol%, ZnO is 4–10 mol%, and the total proportion of $Cs_2O + SiO_2 + Na_2O + K_2O + ZnO$ is at least 95 mol%.

6. The glass lens of claim 1 which has a concentration of the ions of at least one metal selected from the group consisting of lithium, sodium, potassium and rubidium gradually increasing from the central axis of the lens towards the peripheral surface.

* * * * *